United States Patent Office 3,626,659
Patented Dec. 14, 1971

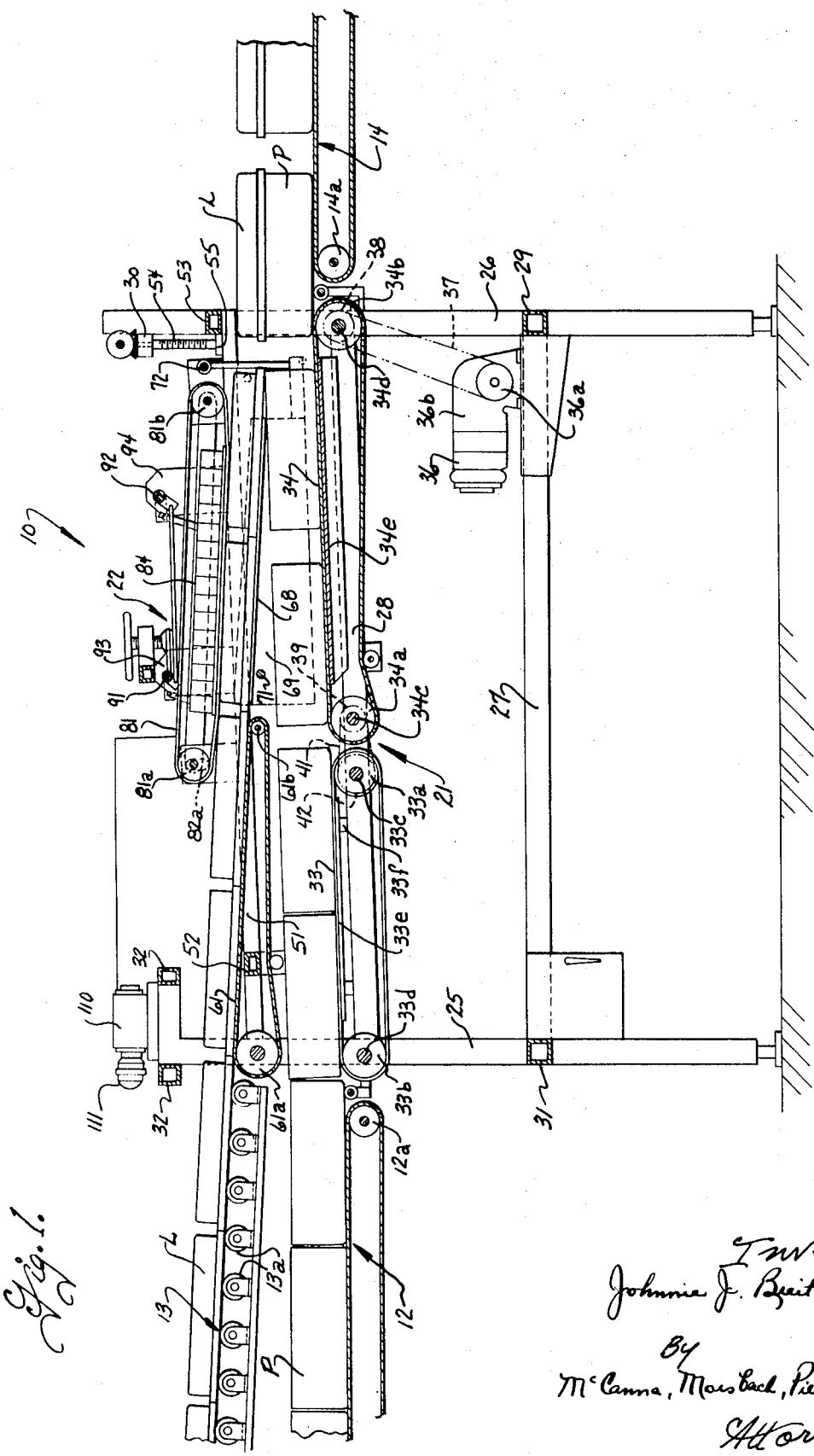

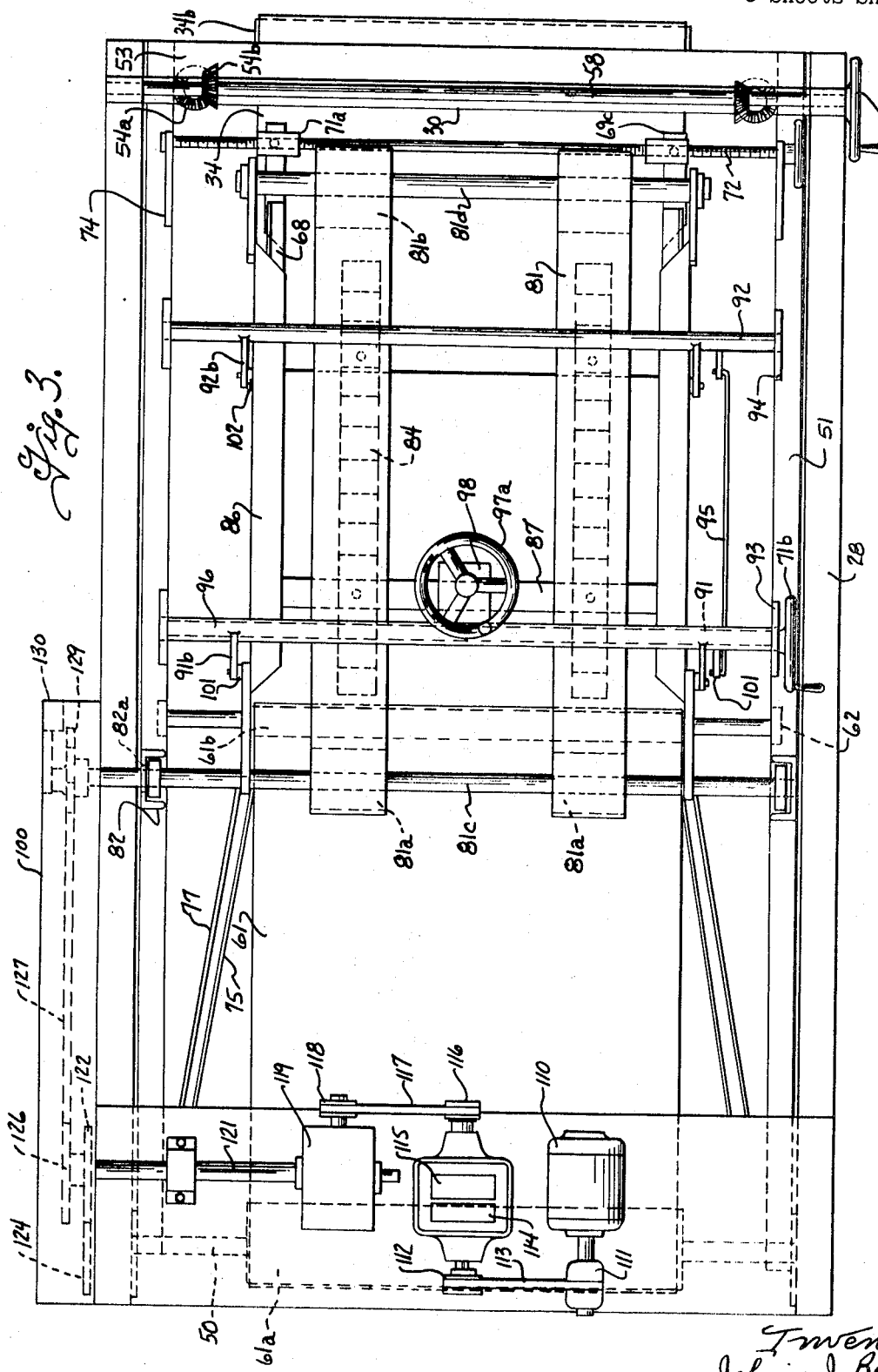

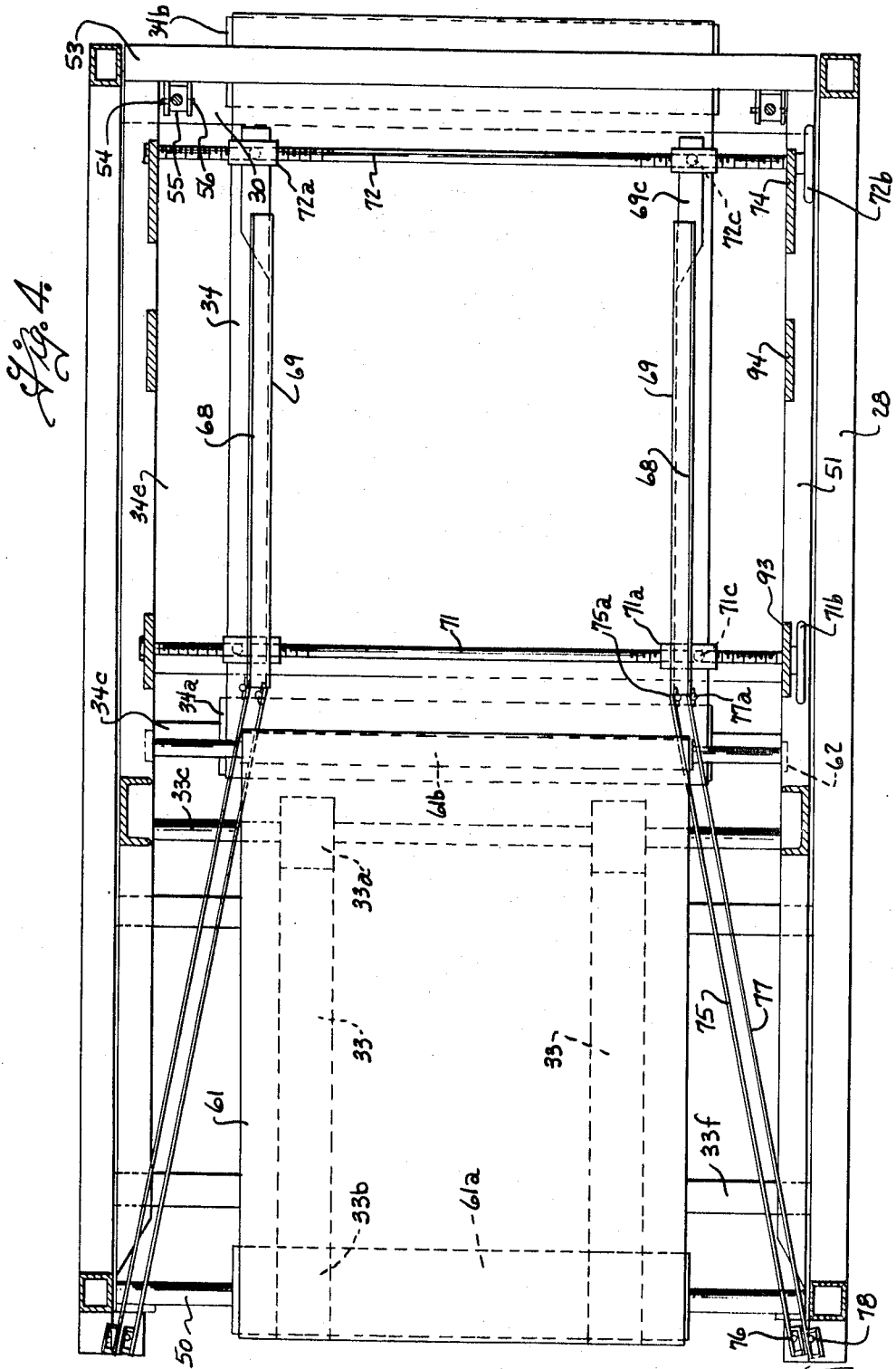

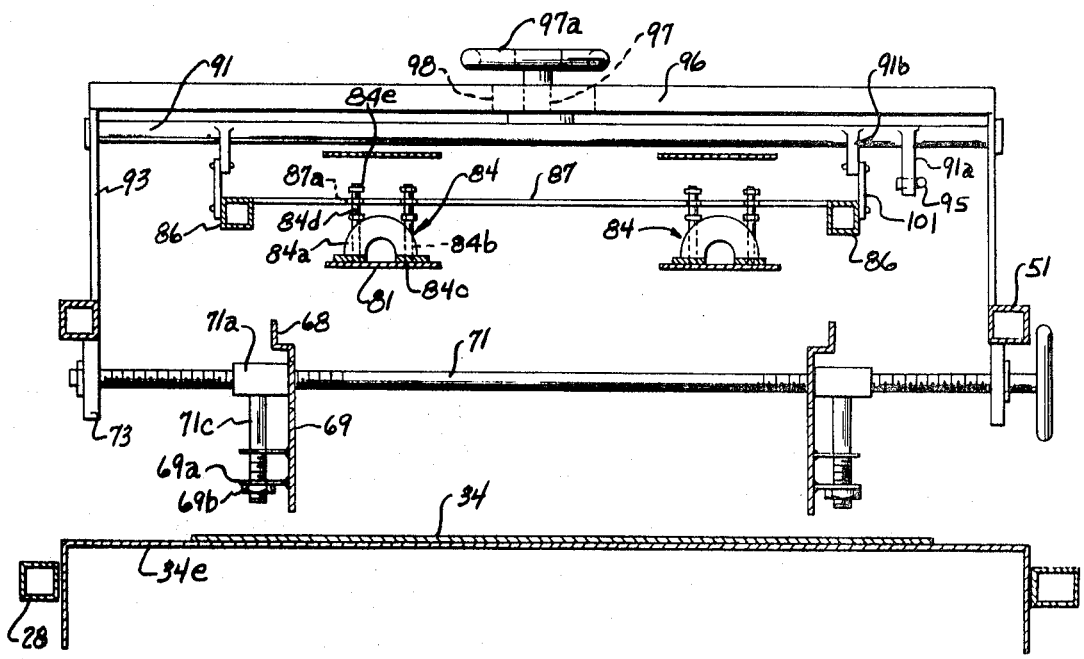
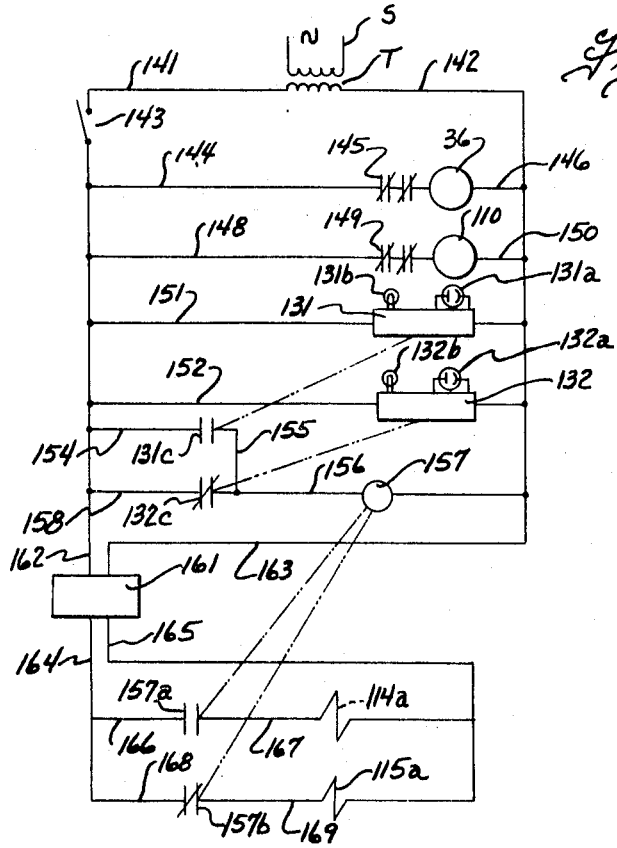

3,626,659
APPARATUS FOR APPLYING LIDS TO PANS
Johnnie J. Breitbach, Rockford, Ill.
(11 Hawthorne Drive, Normal, Ill. 61761)
Filed June 12, 1970, Ser. No. 45,752
Int. Cl. B65b 57/02, 7/28
U.S. Cl. 53—71                       18 Claims

ABSTRACT OF THE DISCLOSURE

An apparatus for applying magnetizable lids to pans as the latter are advanced by a pan conveyor past a lid applying station. The lids are advanced to the lid applying station by a lid conveyor assembly having a first endless type conveyor that underlies the lids, and a second magnetic endless conveyor that overlies the lids. The lid conveyors are selectively driven in a direction to advance lids to the lid applying station and are then braked to stop and hold the lids in position until a pan is advanced to the lid applying station. The pan conveyor includes an inlet section and an outlet section for advancing the pans past the lid applying station and the outlet section is driven at a speed higher than the inlet section to effect separation of the pans as they move past the lid applying station.

---

The present invention is particularly adapted for use in applying metal lids to bread pans as the latter are advanced past a lid applying station. Apparatus such as disclosed in U.S. Patent 2,669,377 have heretofore been proposed for guiding lids in downwardly converging relation to the bread pans on a pan conveyor and for supporting the lowermost lid in position to be engaged by the bread pan as it is advanced. However, such prior lid applying apparatus utilized mechanical stop means for engaging the lowermost lid to stop the advancing stream of lids and a means for moving the mechanical stop to a release position as the bread pan moves past the lid applying station to enable dispensing of a lid. Bread pan lids are relatively heavy and high shock loads are produced when the moving stream of such lids are abruptly stopped by engagement with a mechanical stop. Such shock loads not only tend to damage and wear the mechanical stop mechanism, but also tend to bend, distort and otherwise damage the lids.

It is the object of the present invention to overcome the disadvantages of the prior art by providing a lid applying apparatus having an endless type lid conveyor mechanism which is selectively driven to advance lids to the lid applying station and then braked to interrupt advance of the stream of lids.

The lid conveyor mechanism includes a lid guide spaced above the pan conveyor for guiding endwise abutting lids in converging relation to the pan conveyor and an endless magnetic lid conveyor that overlies the lid guide and is arranged to engage the magnetizable metal lids to hold the lids against advance when the lid conveyor is stopped and to advance the lids to the lid applying station when the lid conveyor is driven. Driving of the lid conveyor is automatically effected to advance lids toward the lid applying station and to stop the advance of the lids when the lowermost lid reaches a predetermined position. The endless magnetic lid conveyor partially overlies and cooperates with an endless type lid infeed conveyor that underlies and supports the lid so that the incoming lids are effectively gripped between the lid infeed conveyor and the magnetic conveyor when the lid conveyors are stopped. The pan conveyor is arranged to effect separation of the pans as they are advanced past the lid applying station and for this purpose includes an infeed section and an outfeed section that advances the pans past the lid applying station and which is driven at a higher speed than the infeed section to effect separation of the pans.

These, together with other objects, features and advantages of this invention will be more readily understood by reference to the following detailed description when taken in connection with the accompanying drawings wherein:

FIG. 1 is a longitudinal sectional view through the lid applying apparatus and showing its installation in a conveyor system for the pans and lid;

FIG. 2 is a side elevational view of the lid applying apparatus on a larger scale than FIG. 1;

FIG. 3 is a plan view of the lid applying apparatus;

FIG. 4 is a horizontal sectional view taken on the plane 4—4 of FIG. 2;

FIG. 5 is a fragmentary sectional view taken on the plane 5—5 of FIG. 2 illustrating the magnetic conveyor assembly; and FIG. 6 is a schematic diagram of the electrical control system for the lid applying apparatus.

In a fully mechanized bakery, such as diagrammatically illustrated in the aforementioned Patent No. 2,669,377, conveyor mechanism is provided for advancing the filled and covered pans from a lid applying apparatus or lidder through the raising and/or baking ovens, and from the baking oven past a delidder mechanism where the lids are separated from the baking pans. The separated lids are then conveyor back to the lidder and the pans are advanced separately past a depanner where the baked loaves are removed. The empty pans are then conveyed past a panner where dough is again loaded into the pans and the filled pans then advanced back to the lidder. The lid applying apparatus 10 is shown in FIG. 1 connected in such a conveyor system including an infeed pan conveyor 12 for advancing the filled pans P to the lid applying apparatus; an infeed lid conveyor 13 for conveying lids L to the lid applying apparatus; and an outfeed pan conveyor 14 for conveying the filled and lidded pans to the raising and baking ovens. The conveyors 12, 13 and 14 which feed the pans and lids to the lidder and which carry the lidded pans from the lidder can be of any suitable type and, in the embodiment shown, the infeed pan conveyor 12 is of the endless belt type entrained over a roller 12a while the infeed lid conveyor 13 is of the roller type having spaced rollers 13a arranged in downwardly inclined relation so as to guide the lids L by gravity to the lid applying apparatus 10. The outfeed pan conveyor 14 is also herein shown of the endless type entrained over a roller 14a and may be driven in any suitable manner to advance the filled and lidded pans away from the lidder 10.

The lidder 10 in general includes a pan conveyor mechanism 21 for conveying the filled pans P past the lid applying station, and a lid conveyor mechanism 22 which is operative when driven to advance lids L to a lid applying station at a preselected location above the pan conveyor, and which is operable when stopped to brake advance of the lids and to support a lid at the lid applying station in position for engagement by a pan as it is advanced therepast. In the embodiment shown, the lidder includes a main frame having front and rear uprights 25 and 26 which are interconnected by longitudinal frame members 27 and 28 and cross frame members 29, 30, 31 and 32. For reasons pointed out hereinafter, the pan conveyor 21 is preferably formed in two sections and includes an inlet pan conveyor section 33 arranged to receive the filled pans P as they are advanced from the pan conveyor 12, and an outlet pan conveyor section 34 arranged to receive pans from the conveyor section 33 and advance the same past the lid applying station to the outfeed pan conveyor 14. Inlet pan conveyor 33 is of the endless belt type and is entrained over rollers 33a and 33b conveniently rotatably supported in the longitudinal frame members 27 by shafts 33c and 33d. As shown, a support platform 33e is mounted by cross members 33f on the longitudinal frame members 27 and underlies the upper run of the endless conveyor 33 to support the same. The pans exiting from the pan conveyor 12 are not always in proper lateral position and, in order to facilitate lateral shifting of the pans to properly position the same in a manner described hereinafter, the conveyor 33 is preferably selected so as to minimize traction between the conveyor and pans. The conveyor may, for example, be of the articulated plate type or otherwise formed with a smooth slidable surface for engaging the underside of the pans to permit lateral shifting of the pans relative thereto. In the preferred embodiment shown, the inlet pan conveyor comprises a pair of laterally spaced endless conveyor sections (see FIG. 4). Endless conveyor 34 is entrained over rollers 34a and 34b also conveniently supported as by shafts 34c and 34d on the longitudinal rails 27 of the frame. Conveyor 34 is arranged to advance the pans past the lid applying station and is preferably formed so as to provide good traction between the conveyor and pans. The conveyor may, for example, be formed of rubber or a rubberized cloth to enhance tractive engagement with the pans. As shown, a support platform 34e underlies the upper run of the endless belt 34 to support the same.

The pans P as they are advanced to the lidder are commonly in abutting end-to-end relation and provision is made for separating the pans as they are advanced past the lid applying station. As shown in FIGS. 1 and 2, a conveyor drive motor 36 is provided for driving the pan conveyors and the motor drives a sprocket 36a through a speed reducer 36b. The sprocket 36a is connected by a chain 37 to a drive sprocket 38 nonrotatably connected to one of the roller shafts 34d of the endless conveyor 34. The pan conveyor drive motor 36 is adapted, when energized, to continuously drive the conveyor 34 in a direction to advance the pans P past the lid applying station and conveyor 34 is driven at a speed higher than the conveyor 33 so as to separate the pans as they pass from the inlet conveyor to the outlet conveyor. As shown in FIGS. 1 and 2, a sprocket 39 is nonrotatably mounted on one of the outlet pan conveyor shafts 34c of the outlet conveyor 34 and is connected as through a chain 41 to a sprocket 42 nonrotatably connected to one of the inlet pan conveyor shafts 33c. Sprockets 39 and 42 are selected so that the latter has a larger diameter whereby conveyor 34 is driven at a relatively higher speed than conveyor 33 to effect separation of the pans as they pass from conveyor 33 to conveyor 34 sufficient to provide adequate time after completion of lidding of one pan, to advance a succeeding lid into proper position for engagement by a succeeding pan. In practice, a pan spacing of 6 to 8" is adequate.

The lid conveyor assembly 22 is mounted on the main frame for vertical adjustment relative to the pan conveyor 21, so as to accommodate pans of a different height. As best shown in FIGS. 2–4, the lid conveyor assembly is mounted on an adjustable lid conveyor frame including spaced side members 51 which are rigidly interconnected by cross members 52 and 53. The frame is swingably supported adjacent the inlet end of the lidder on a shaft 50, and the other end of the frame is vertically adjustably supported to accommodate pans of different height. Any suitable arrangement may be provided for adjusting the height of the frame and, as shown in FIGS. 2 and 5, threaded rods 54 engage internally threaded followers 55 swively supported by pins 56 on the adjustable lid conveyor frame. The rods 54 are nonslidably and rotatably supported on the cross frame member 30 and have bevel gears 54a (FIG. 3) at their upper ends which mesh with gears 54b on a cross shaft 58. The shaft 58 is adjustable from the side of the machine as by a crank wheel 59 to enable selective raising and lowering of the frame.

An inlet lid conveyor 61 of the endless type is entrained over rollers 61a and 61b mounted on the side frame members 51 and is arranged to underlie and support the lids as they pass from the lid conveyor 13 to the lidder 10. Roller 61a is conveniently nonrotatably mounted on the shaft 50 which also supports one end of the adjustable frame 51 and roller 61b is supported by bearings 62 on the underside of the side members 51. Inlet lid conveyor 61 can be of any suitable construction and may, for example, be of the cloth type. Lid guide members in the form of L-shaped rails 68 are mounted to extend from the outlet of the inlet lid conveyor 61 to the lid applying station to laterally guide and support the lids as they are advanced to the lid applying station. Lateral pan guides 69 are conveniently formed integrally with the lid guides 68 and extend downwardly therefrom to engage opposite sides of the pans as they are advanced along the pan conveyor and to guide the pans and lids into interfitting relation. In order to accommodate pans of different widths (measured in a direction crosswise of the pan conveyor) the lid guides 68 and pan guides 69 are supported on the lid conveyor frame 51 for lateral adjustment. One suitable arrangement for laterally adjustably supporting the lid and pan guides is best shown in FIGS. 2 and 4 and includes first and second cross shafts 71 and 72 supported in bearing blocks 73 and 74 on the side members 51 of the lid conveyor frame. The shafts 71 and 72 have oppositely threaded end portions and followers 71a and 72a which engage the threaded end portions to be adjusted toward and away from each other in response to rotation of the shafts by their respective cranks 71b and 72b. Rods 71c extend downwardly and are attached to the lateral pan guides 69 to support the same. As shown in FIG. 2, the rods extend through lateral ears 69a on the pan guides and are vertically adjustable as by a nut 69b. Similar rods 72c extend downwardly from the followers 72a and through brackets 69c on the rear ends of the pan guides 69. The rear ends of the pan guides are also vertically adjustably supported as by nuts 72d on rods 72. With this arrangement, the lateral pan guides 69 and the lid guide and support rails 68 can be laterally adjusted as well as vertically adjusted to accommodate pans and lids of different size. If desired, shafts 71 and 72 could be interconnected as by sprockets and chains so as to enable both ends of the lateral pan guides to be adjusted simultaneously.

Inlet pan guides 75 are supported as by hinges 75a on the pan guides 69 and extend in relatively diverging relation toward the inlet end of the lidder 10. As best shown in FIGS. 2 and 4, the inlet ends of the guides 75 are supported as by pins 76 on the main frame. Lateral lid guides 77 are also mounted as by hinges 77a on the lateral pan guides 69 and extend in relatively diverging relation toward the inlet end of the lidder at a level above the lid conveyor 61 to laterally guide the lids. As shown, the inlet ends of the guides 77 are supported as by pins 78 on the main frame.

The bread pan lids L are generally made of ferromagnetic or magnetizable material and the lid conveyor mechanism 22 also includes an endless type magnetic conveyor that overlies the lids and which cooperates with the inlet lid conveyor 61 to control advancing and stopping of the lids. The magnetic conveyor 22 is of the endless type and, in the embodiment illustrated, includes a pair of laterally spaced endless belts 81 entrained over rollers 81a and 81b rotatably mounted by shafts 81c and 81d in bearings at the ends of auxiliary frame members 86. The auxiliary frame members are rigidly interconnected by cross members 87 to form a frame structure for the magnetic conveyor. The belts 81 are preferably formed of a nonmagnetic material such as cloth or leather, and a permanent magnet assembly 84 is positioned over the lower run of the belt 81 to attract the belt to the magnetizable pan lids L. As best shown in FIG. 5, the magnet assemblies include a plurality of permanent magnets 84a disposed in sidewise aligned relation and attached as by mounting bolts 84b to pole pieces 84c that extend longitudinally of the lidder apparatus. The pole pieces on each magnet assembly are spaced apart a distance substantially greater than twice the thickness of the belt so that the magnetic flux path tends to extend through the belt 81 and to the magnetizable lid L that underlies the belt. Provision is made for adjustably supporting the magnet assemblies 84 on the auxiliary frame members 86 to control the pressure exerted by the magnet assemblies on the belt and hence on the lids L. As shown in FIG. 6, rods 84d are attached to the magnet assemblies 84 and slidably extend upwardly through openings 87a in the cross members 87 to support the magnet assemblies for limited vertical lost motion with respect to the cross members, while inhibiting lengthwise movement of the magnet assemblies. Stop nuts 84e are provided on the rods 84d to limit downward movement of the magnet assemblies. As will be seen, the nuts 84e can be individually adjusted to control downward pressure exerted by the magnet assembly on the belt and lids. The auxiliary frame for the magnetic conveyor is preferably mounted for vertical adjustment relative to the lid conveyor frame members 51, to accommodate lids of different thickness. For this purpose, a pair of cross shafts 91 and 92 are rotatably supported at opposite ends in bearing blocks 93 and 94 secured to the lid conveyor frame members 51. The rods 91 and 92 have rigid lateral arms 91a and 92a which are interconnected by a linkage 95 to equalize angular movements of the rods 91 and 92. A rigid cross member 96 extends between one pair of bearing blocks 94 and an adjusting means such as a screw 97 is mounted in a support block 98 on the cross piece and arranged to engage an arm 99 extending laterally from one of the rods 92 to angularly adjust the rod. Rods 91 and 92 also have laterally extending support arms 91b and 92b respectively and which are connected through links 101 and 102 to the side frame members 86 of the auxiliary frame to support the latter. With this arrangement, the vertical position of the auxiliary frame members 86 can be selectively manually adjusted as by turning the crank wheel 97a on the screw 97 to raise and lower the magnetic conveyor and magnet assembly. In order to inhibit movement of the auxiliary frame members 86 in a direction lengthwise of the lidder, while permitting the aforementioned vertical adjustment of the auxiliary frame relative to frame members 51, rollers 103 are provided on the ends of the shaft 81c and the rollers are received in generally upright channel shaped guides 82 on the frame members 51. One end of shaft 81c extends through a vertically elongated opening 82a in one of the guides 82 and has a drive sprocket 129 at its outer end.

A drive mechanism is provided for selectively driving the lid conveyors 61 and 81 in a direction to advance a lid to the lid applying station and for stopping the lid conveyors to brake advance of the lids when the end lid reaches a preselected position at the lid applying station. As best shown in FIGS. 2 and 3, this drive mechanism includes a drive motor 110 which is connected through a preferably adjustable speed drive mechanism such as the adjustable cone pulleys 111 and 112 and belt 113 to the input shaft of a clutch-brake mechanism 114, 115. The clutch-brake mechanism has its output shaft connected through pulley 116, belt 117 and pulley 118 to a speed reducer mechanism 119 having an output shaft 121. The speed reducer output shaft 121 is connected to drive the inlet lid conveyor 61 in a direction to advance the upper run thereof toward the lid applying station and is also connected to drive the magnetic conveyor 81 at the same speed, but in a direction to advance the lower run toward the lid applying station. Any arrangement suitable for this purpose may be used and, for this reason the drive mechanism, enclosed in housing 100, is shown only diagrammatically in phantom in FIGS. 2 and 3. As illustrated in those views, the drive for the lid conveyor 61 includes a sprocket 122 on the output shaft 121 connected by a chain 123 to a sprocket 124 on the conveyor shaft 54. The drive for the magnetic lid conveyor is shown as having a sprocket 126 on the shaft 121, which sprocket drives a chain 127 entrained over idler sprockets 128a and 128b, with the outer side of the chain meshing with the sprocket 129 on the magnetic conveyor drive shaft 81c. The idler sprockets are conveniently supported as by brackets 130a and 130b on a post 130 secured to the main frame and, in order to allow the aforementioned limited vertical adjustment of the auxiliary frame and the sprocket 129 carried thereby, while maintaining driving engagement with the sprocket, the idler sprockets are arranged above and below the sprocket 129 on the shaft 81c of the magnetic conveyor. This arrangement drives the inlet lid conveyor drive pulley 61a in a clockwise direction and the magnetic conveyor drive pulley 81a in a counterclockwise direction, under the control of the clutch-brake 114, 115 and at a speed determined by the adjustable speed drive 111–113. For reasons which will become apparent, the speed of the conveyors 61 and 81 is adjusted so as to be approximately equal to but preferably no greater than the speed of the outlet pan conveyor 34.

Operation of the clutch-brake drive for the lid conveyors is under the control of lid and pan sensors located at the lid dispensing station. The lid and pan sensors can be of any conventional construction and are herein diagrammatically shown as photoelectric units including a photoelectric lid sensor 131 and a photoelectric pan sensor 132. The photoelectric sensor units are themselves of conventional construction and include a photosensitive element 131a, 132a and a beam transmitting light source 131b and 132b respectively. The beam transmitting light source can be located at the side of the lid and pan conveyors opposite the photosensitive unit or, alternatively, can be located at the same side with a mirror positioned at the opposite side to reflect the beam. As shown in FIGS. 1 and 2, the photoelectric unit 131 is positioned at the lid applying station at a level to have the light beam interrupted by a lid when it reaches a preselected position thereat. The pan detector 132 is also positioned at the lid applying station and in a position to have the light beam interrupted by a pan as it is advanced past the lid applying station. As diagrammatically shown in FIG. 1, the lids are of a configuration that portions of the lids are spaced apart when the lids are in abutting relation and the sensor 131 is positioned at a level to sense this gap between adjacent lids. However, as pointed out hereinafter, this lid configuration is not absolutely essential and provision can be made for spacing the lid being dispensed from the next adjacent lid so as to allow interruption of the light beam.

An electrical control circuit for the lidder apparatus is diagrammatically shown in FIG. 7. As illustrated therein, power from a supply suorce S is applied through a transformer T to conductors 141 and 142. A main on-off switch 143 is provided in one of the conductors 141 to control starting and stopping of the lid applying apparatus. The pan conveyor drive motor 36 is connected to conductors 141 and 142 after the switch 143, as by conductors 144, motor overload switches 145 and conductor 146. The lid conveyor drive motor 110 is similarly connected to the conductors 141 and 142 after the main on-off switch 143 as by conductor 148, overload relays 149 and conductor 150. Photoelectric relays 131 and 132 are also connected as by conductors 151 and 152 to the conductors 141 and 142 after the main on-off switch 143 so as to be energized when the on-off switch is closed. Photoelectric relay 131 controls operation of normally open relay contacts 131c and is arranged to close the contacts when the photoelectric relay 131 is energized, that is when light from the source 131b impinges on the photosensitive unit 131a. Photoelectric relay 132 is arranged to operate normally closed relay contacts 132c and is operative to open the contacts when the light from the source 132b impinges on the photosensitive unit 132a. As shown in FIG. 7, normally open contacts 131c are connected by conductors 154, 155 and 156 in series with a relay 157 and across the power supply conductors 141 and 142. Normally closed relay contact 132c is connected in parallel with contact 131c and in series with the relay 157, by conductors 158 and 156.

DC power is utilized for operating the clutch and brake units 114 and 115 respectively and for this purpose, a rectifier unit 161 is connected by conductors 162 and 163 to the power supply conductors 142, and provides DC output at conductors 164 and 165. Normally open relay contacts 157a controlled by relay 157 are connected by conductors 166 and 167 in series with the clutch operating coil 114a and across the DC power supply conductors 164 and 165 and a normally closed relay contact 157b is connected in series with the brake operating coil 115a as by conductors 168 and 169. Relay 157 is operative, when energized, to close the contacts 157a for the clutch coil 114a and to open the contacts 157b for the brake coil 115a.

From the foregoing it is thought that the construction and operation of the lid applying appaartus will be readily understood. If there is no lid which interrupts the light beam to photosensitive element 131a at the lid applying station, the photoelectric relay 131 is energized and closes relay contact 131c to energize relay 157 and close the clutch operating relay contact 157a and open the brake operating relay contact 157b to drivingly connect the lid drive motor 110 to the lid conveyors 61 and 81. The lid conveyors are then driven to advance lids toward the lid applying station until the end lid intercepts the light beam from source 132b to the photosensitive element 132a. At that time, relay 131a is denergized and allows relay contacts 131c to open and deenegize the relay 157. This in turn opens the clutch control relay contacts 157a and allows the brake control contacts 157b to close to thereby deenergize the clutch and operate the brake to stop drive of the lid conveyors.

The pan conveyors operate to advance pans past the lid applying station and the outlet pan conveyor is driven at a speed higher than the inlet pan conveyor so as to separate the pans from each other as they are advanced past the lid applying station, as best shown in FIG. 1. When a pan engages a lid at the lid applying station, it begins to draw the lid off the lid support and guide members 68. The photoelectric detector for the pans is preferably arranged so as to be actuated by a pan at about the same time that the pan engages the lid, but preferably slightly after so as to enable the pan to draw the lid away from the next adjacent lid on the lid dispenser. When the pan interrupts the light beam from the source 132b, it deenergizes the relay 132 and allows the normally closed contacts 132c to close to thereby energize relay 157 to actuate the clutch 114 and deactuate the brake 115. The lid conveyors are then driven in a direction to advance the lids and, as previously described, are driven at a speed approximating the pan conveyor speed but slightly less than the pan conveyor speed to avoid pushing the end lid in front of the pan. The lid conveyors thus aid in dispensing the end lid and moreover simultaneously advance a succeeding lid toward the lid applying station. After a pan has moved out of position at the lid applying station, the pan relay is again energized to open relay contact 132c so that the clutch and brake control relay 157 remains under operation of the lid detecting relay 131. The latter continues advance of the lids until the lid reaches a preselected position at the lid applying station and interrupts the light beam from the light source 131b.

The magnetic conveyor not only aids in advancing the lids to the lid applying station and dispensing lids when a pan reaches the lid applying station, but also provides a reliable brake mechanism for stopping advance of the stream of lids without requiring a mechanical stop that engages the lids. The magnet assembly draws the belts 81 against the tops of the lids and operates, when the belt conveyor is stopped, to magnetically retard advance of the lids and to also increase the pressure between the lids and the belt to frictionally retard movement of the lids relative to the belt. In addition, the magnetic belt conveyor has its inlet end in overlying relation to the outlet end of the lid conveyor 61. The magnetic conveyor applies downward pressure on the belt and presses the lids against the outlet end of the conveyor 61 so as to reliably hold the lids against advancement. Thus, the magnetic lid conveyor 81 operates when the conveyors are stopped, to stop advancement of the stream of lids entering the lid applying apparatus.

While I have described a presently preferred embodiment of my invention, it is to be understood that the invention can be otherwise embodied within the scope of the appended claims.

The embodiments of the invention in which an exclusive property or privilege is claimed are defined as follows:

1. In an apparatus for applying lids to ans including pan conveyor means for advancing pans past a lid applying station and lid conveyor means for advancing lids to the lid applying station, the improvement wherein said lid conveyor means includes a first endless lid conveyor adapted to underlie and support lids on the upper run thereof and a second endless lid conveyor having a portion overlying a portion of the first endless lid conveyor, means for urging the lower run of said second lid conveyor into engagement with the upper side of a lid supported in the first endless lid conveyor, drive means operable to simultaneously drive said first and second endless lid conveyors in a direction to advance the upper run of the first endless lid conveyor and the lower run of the second endless lid conveyor toward said lid applying station, and means responsive to advance of a lid to said lid applying station for stopping said first and second lid conveyors.

2. An apparatus according to claim 1 wherein said lids are formed of a magnetizable material and said means for urging the lower run of said second endless conveyor into engagement with the lids includes magnet means overlying the lower run of said second endless conveyor.

3. An apparatus according to claim 2 wherein said second endless conveyor includes a nonmagnetic endless belt.

4. An apparatus according to claim 1 wherein said pan conveyor means includes a first endless pan conveyor and a second endless pan conveyor extending from the outlet end of the first pan conveyor and past said lid applying station, and means for driving said second endless pan conveyor at a speed higher than said first pan conveyor to separate the pans as they move past the lid applying station.

5. In an apparatus for applying magnetizable lids to pans including pan conveyor means for advancing pans past a lid applying station and lid conveyor means for advancing lids to the lid applying station, the improvement wherein said lid conveyor means includes a lid guide means spaced above the pan conveyor means and adapted to guide a plurality of endwise abutting lids in converging relation with pan conveyor means to a lid applying station, endless lid conveyor mean overlying said lid guide means at said lid applying station and having the lower run thereof arranged to engage the lids on said lid guide means, said endless lid conveyor means including magnet means overlying said lower run of said lid conveyor means to magnetically draw the lids against the lower run of the endless lid conveyor means, drive means actuatable between a drive condition in which it drives said endless lid conveyor means in a direction to advance lids engaged by the lower run thereof toward the lid applying station and a stop condition in which it brakes said endless lid conveyor means to stop advance of lids toward the lid applying station, and drive control means operative to actuate said drive means to said drive condition to advance lids toward said lid applying station and operative in response to advance of a lid to a predetermined position at said lid applying station to actuate said drive means to said stop condition to brake said endless lid conveyor means.

6. An apparatus according to claim 5 wherein said drive means includes means responsive to advance of a pan on said pan conveyor means to said lid applying station for actuating said drive means to said drive condition.

7. An apparatus according to claim 6 wherein said pan conveyor means includes a first endless pan conveyor extending past said lid applying station and a second endless pan conveyor arranged to discharge pans onto said first endless pan conveyor, and means for driving said first endless pan conveyor at a speed sufficiently higher than said second endless pan conveyor to separate the pans as they move past the lid applying station.

8. In an apparatus for applying magnetizable lids to pans including pan conveyor means for advancing pans past a lid applying station and lid conveyor means for advancing lids to the lid applying station, the improvement wherein said lid conveyor means includes a first endless lid conveyor adapted to underlie and support lids on the upper run thereof and lid guide means extending from the outlet of the first endless lid conveyor to the lid applying station to guide a lid from the first endless lid conveyor in converging relation with the pan conveyor means, said lid conveyor means also including a second endless lid conveyor overlying said lid guide means and arranged to have the lower run thereof engage the upper side of lids on said lid guide means, said second endless lid conveyor including magnet means for magnetically attracting the lower run of said second endless lid conveyor to said magnetizable lids, drive means actuatable between a drive condition in which it drives said first and second endless lid conveyors in a direction to advance the upper run of the first lid conveyor and the lower run of the second lid conveyor toward the lid applying station and a stop condition in which it brakes said first and second endless conveyors, and drive control means operative to actuate said drive means to said drive condition to advance a lid toward said lid applying station and operative in response to advance of a lid to a predetermined position at said lid applying station to actuate said drive means to said stop condition.

9. An apparatus according to claim 8 wherein said drive means includes means responsive to advance of a pan on said pan conveyor means to said lid applying station for actuating said drive means to said drive condition.

10. An apparatus according to claim 9 wherein said pan conveyor means includes a first endless pan conveyor extending past said lid applying station and a second endless pan conveyor arranged to discharge pans onto said first endless pan conveyor, and means for driving said first endless pan conveyor at a speed sufficiently higher than said second endless pan conveyor to separate the pans as they move past the lid applying station.

11. An apparatus according to claim 9 wherein said drive means includes means for selectively adjusting the speed at which said first and second endless lid conveyors are driven to advance lids at a speed approximating the speed at which pans are advanced by said pan conveyor means.

12. An apparatus according to claim 8 wherein said second endless conveyor overlies a portion of said first endless conveyor adjacent the outlet end of the latter.

13. An apparatus for applying magnetizable lids to pans including a support frame, pan conveyor means mounted on said support frame for advancing pans from an inlet end of said apparatus past a lid applying station, a lid conveyor frame overlying said pan conveyor means and extending lengthwise thereof, means pivotally mounting one end of said lid conveyor frame adjacent the inlet end of said apparatus and means engaging said lid conveyor frame adjacent the other end thereof for adjustably raising and lowering said other end of the lid conveyor frame, lid guide means mounted on said lid conveyor frame for guiding a plurality of endwise abutting lids in downwardly converging relation with said pan conveyor means to the lid applying station, endless lid conveyor means mounted on said lid conveyor frame and overlying said lid guide means at said lid applying station and having the lower run thereof arranged to engage lids on said lid guide means, said endless lid conveyor means including magnet means overlying the lower run of said endless lid conveyor means to magnetically draw the lids against the lower run of the endless lid conveyor means, drive means actuatable between a drive condition in which it drives said endless lid conveyor means in a direction to advance lids engaged by the lower run thereof toward the lid applying station and a stop condition in which it brakes said endless lid conveyor means to stop advance of the lids toward the lid applying station, and drive control means operative to actuate said drive means to said drive condition to advance lids toward said lid applying station and operative in response to advance of a lid to a predetermined position at said lid applying station to actuate said drive means to brake said endless lid conveyor means.

14. An apparatus according to claim 13 including means on said lid conveyor frame for laterally adjusting said lid guide means relative thereto to accommodate lids of different size.

15. An apparatus according to claim 14 including lateral pan guide means connected to said lid guide means for lateral adjustment therewith.

16. An apparatus according to claim 13 including means on said frame for adjustably raising and lowering said endless lid conveyor means relative to said lid conveyor frame to accommodate lids of different thickness.

17. An apparatus according to claim 13 wherein said lid guide means includes a second endless type lid conveyor mounted on said lid conveyor frame and underlying the lids to support and advance the same, said drive means including means for driving said second endless lid conveyor at a speed correlative with that of the first-mentioned lid conveyor means and in a direction to advance the upper run of the second endless lid conveyor toward said lid applying station.

18. An apparatus according to claim 17 wherein said second endless type lid conveyor is entrained over inlet and outlet rollers, the inlet roller having its axis adjacent said one end of the lid conveyor frame.

References Cited

UNITED STATES PATENTS 2,659,522 11/1953 Ninneman et al. _____ 53—71
3,383,834 5/1968 Switliski et al. _____ 53—315

TRAVIS S. McGEHEE, Primary Examiner

U.S. Cl. X.R.

53—313